(12) United States Patent
Guo et al.

(10) Patent No.: US 10,999,061 B2
(45) Date of Patent: May 4, 2021

(54) SERVICE DATA STORAGE METHOD AND APPARATUS, STORAGE MEDIUM, AND ELECTRONIC DEVICE

(71) Applicant: Tencent Technology (Shenzhen) Company Limited, Shenzhen (CN)

(72) Inventors: Rui Guo, Shenzhen (CN); Maocai Li, Shenzhen (CN); Jun Liang, Shenzhen (CN); Jianjun Zhang, Shenzhen (CN); Zongyou Wang, Shenzhen (CN); Qi Zhao, Shenzhen (CN); Haitao Tu, Shenzhen (CN); Binhua Liu, Shenzhen (CN); Dawei Zhu, Shenzhen (CN); Qing Qin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 89 days.

(21) Appl. No.: 16/523,585

(22) Filed: Jul. 26, 2019

(65) Prior Publication Data

US 2019/0349188 A1 Nov. 14, 2019

Related U.S. Application Data

(63) Continuation of application No. PCT/CN2018/090630, filed on Jun. 11, 2018.

(30) Foreign Application Priority Data

Jun. 12, 2017 (CN) .......................... 201710438944.0

(51) Int. Cl.
*H04L 9/06* (2006.01)
*H04L 9/08* (2006.01)
*H04L 9/32* (2006.01)

(52) U.S. Cl.
CPC .......... *H04L 9/0637* (2013.01); *H04L 9/0866* (2013.01); *H04L 9/0872* (2013.01); *H04L 9/3213* (2013.01); *H04L 2209/38* (2013.01)

(58) Field of Classification Search
None
See application file for complete search history.

(56) References Cited

U.S. PATENT DOCUMENTS

| 9,635,000 B1 | 4/2017 | Muftic | |
|---|---|---|---|
| 2004/0125003 A1* | 7/2004 | Craven | ............... H03M 7/3046 341/76 |

(Continued)

FOREIGN PATENT DOCUMENTS

| CN | 105488431 A | 4/2016 |
|---|---|---|
| CN | 106406896 A | 2/2017 |

(Continued)

OTHER PUBLICATIONS

Chinese Office Action dated May 7, 2019 in Application No. 201710438944.0 with English Translation, 8 pages.

(Continued)

*Primary Examiner* — William J. Goodchild
(74) *Attorney, Agent, or Firm* — Oblon, McClelland, Maier & Neustadt, L.L.P.

(57) ABSTRACT

Aspects of the disclosure provide methods and apparatuses for storing service data. In some examples, an apparatus for storing service data includes processing circuitry. The processing circuitry receives service data of a user and determines, in a plurality of blockchains, a target blockchain according to a user attribute of the user. Based on the service data and an eigenvalue of a block header of a first block in the target blockchain, the processing circuitry generates a second block in the target blockchain. The first block is a (Continued)

previous block of the second block. The second block is used for recording the service data.

20 Claims, 4 Drawing Sheets

(56) References Cited

U.S. PATENT DOCUMENTS

| | | | | |
|---|---|---|---|---|
| 2006/0198362 | A1* | 9/2006 | Molev-Shteiman | ........................ H04L 25/03038 370/352 |
| 2008/0279270 | A1* | 11/2008 | Zeng | ................. H04L 25/03133 375/231 |
| 2019/0170641 | A1* | 6/2019 | Little, III | ............. G01N 21/359 |

FOREIGN PATENT DOCUMENTS

| | | |
|---|---|---|
| CN | 106598490 A | 4/2017 |
| CN | 106649838 A | 5/2017 |
| CN | 106682984 A | 5/2017 |
| CN | 106815330 A | 6/2017 |
| CN | 107291862 A | 10/2017 |
| KR | 101166233 B1 | 7/2012 |

OTHER PUBLICATIONS

International Search Report dated Sep. 17, 2018 in Application No. PCT/CN2018/090630 with English Translation, 5 pages.

Written Opinion dated Sep. 17, 2019 in Application No. PCT/CN2018/090630, 4 pages.

European Search Report dated Feb. 8, 2021, in Application No. 18817953.5, (7 pages).

Daza et al., "Connect: CONtextual NarnE disCovery for blockchain-based services in the IoT," 2017 IEEE International Conference on Communications (ICC), May 21, 2017 (6 pages).

* cited by examiner

SERVICE DATA STORAGE METHOD AND APPARATUS, STORAGE MEDIUM, AND ELECTRONIC DEVICE

RELATED APPLICATION

This application is a continuation of International Application No. PCT/CN2018/090630, filed on Jun. 11, 2018, which claims priority to Chinese Patent Application No. 201710438944.0, entitled "SERVICE DATA STORAGE METHOD AND APPARATUS, STORAGE MEDIUM, AND ELECTRONIC DEVICE" filed on Jun. 12, 2017. The entire disclosures of the prior applications are hereby incorporated by reference in their entirety.

FIELD OF THE TECHNOLOGY

This application relates to the field of network technologies, and in particular, to a service data storage method and apparatus, a storage medium, and an electronic device.

BACKGROUND OF THE DISCLOSURE

With development of network technologies, network bandwidth is greatly optimized, network services tend to be diversified, and a server can provide a user with rich services and quickly process a required service for the user.

In a process of processing service data of the user, to back up this service processing process, when receiving the service data of the user, the server may store the service data in a blockchain.

A data structure of the blockchain is blocks connected in chronological order, and the server needs to store the service data serially in the blockchain, resulting in low operation efficiency of the server.

SUMMARY

Aspects of the disclosure provide methods and apparatuses for storing service data. In some examples, an apparatus for storing service data includes processing circuitry.

The processing circuitry receives service data of a user and determines, in a plurality of blockchains, a target blockchain according to a user attribute of the user. Based on the service data and an eigenvalue of a block header of a first block in the target blockchain, the processing circuitry generates a second block in the target blockchain. The first block is a previous block of the second block. The second block is used for recording the service data.

In some embodiments, the processing circuitry determines whether one of the plurality of blockchains corresponds to the user attribute of the user according to preset correspondence information. When one of the plurality of blockchains is determined to correspond to the user attribute of the user, the processing circuitry determines the one of the plurality of blockchains corresponding to the user attribute of the user as the target blockchain. When there is no blockchain corresponding to the user attribute of the user, the processing circuitry determines a shared blockchain in the plurality of blockchains as the target blockchain. The shared blockchain is used for storing service data shared among a plurality of service organizations.

In some embodiments, the processing circuitry receives a service data packet, obtains, from the service data packet, the service data and a signature of the user corresponding to the service data, and validates the signature of the service data.

In some embodiments, the processing circuitry updates the preset correspondence information based on an update instruction.

In some embodiments, the processing circuitry determines the target blockchain according to at least one of a user location of the user, a user equipment of the user, a user level of the user, and a user account of the user.

In some embodiments, the plurality of blockchains provides a data service for at least one service organization.

Aspects of the disclosure also provide a non-transitory computer-readable medium storing instructions which when executed by at least one processor cause the at least one processor to perform any of the methods for storing service data.

BRIEF DESCRIPTION OF THE DRAWINGS

To describe the technical solutions in the embodiments of this application more clearly, the following briefly describes the accompanying drawings required for describing the embodiments. The accompanying drawings in the following description show some embodiments of this application, and a person of ordinary skill in the art may still derive other drawings from these accompanying drawings.

DESCRIPTION OF EMBODIMENTS

To make the objectives, technical solutions, and advantages of this application clearer, the following further describes in detail implementations of this application with reference to the accompanying drawings.

Figure 1:
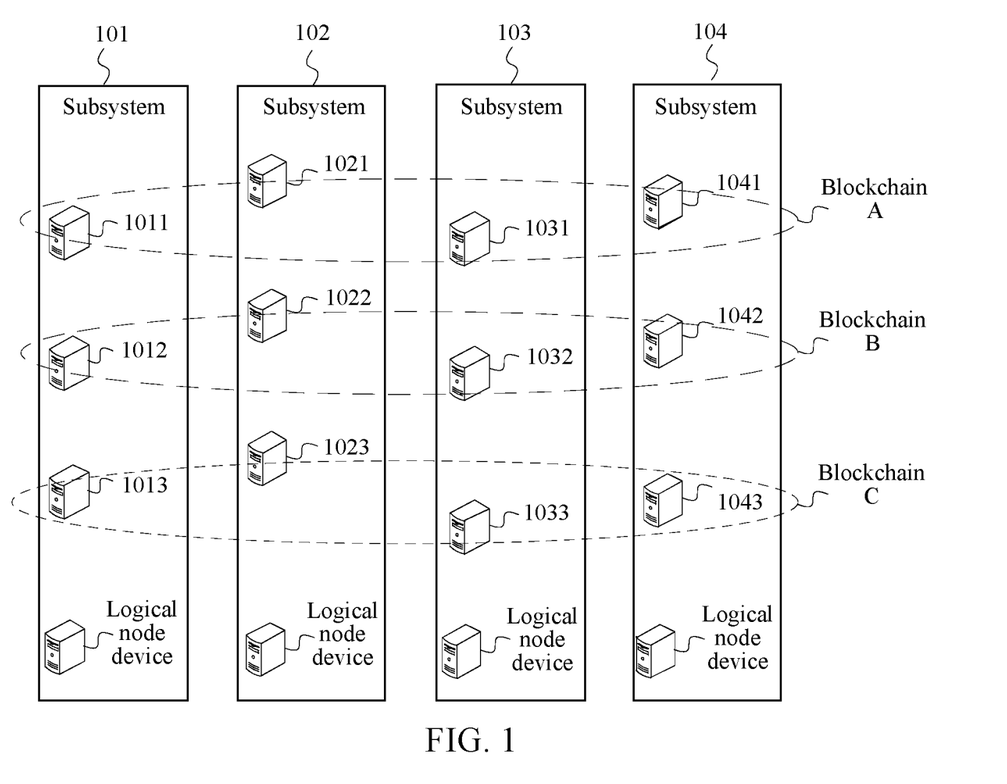
FIG. 1 is a schematic diagram of a service data processing system according to an embodiment of this application.

FIG. 1 is a schematic diagram of a service data processing system according to an embodiment of this application. As shown in FIG. 1, the service data processing system may be constituted by using a plurality of subsystems. Each subsystem may be configured with a plurality of blockchains in accordance with user attributes of users. The same blockchain may be configured between any two subsystems, so that a plurality of subsystems configured with the same blockchain may reach a consensus on service data stored in the blockchain, and provide a service for a user based on the service data.

For example, the service data processing system may be a payment service data processing system. The payment service data processing system includes a subsystem 101, a subsystem 102, a subsystem 103, and a subsystem 104. The subsystem 101 may include a node device 1011, a node device 1012, and a node device 1013 that are deployed by a network service provider, and these three node devices are respectively configured with a blockchain A, a blockchain B, and a blockchain C. The subsystem 102 may include a node device 1021, a node device 1022, and a node device 1023 that are deployed by a bank X, and these three node devices are respectively configured with a blockchain A, a blockchain B, and a blockchain C. The subsystem 103 may include a node device 1031, a node device 1032, and a node device 1033 that are deployed by a bank Y, and these three node devices are respectively configured with a blockchain A, a blockchain B, and a blockchain C. The subsystem 104 may include a node device 1041, a node device 1042, and a node device 1043 that are deployed by a supervision organization, and these three node devices are respectively configured with a blockchain A, a blockchain B, and a blockchain C. Certainly, the subsystems may further be deployed by the same service organization, and each node device may be provided as a server.

User attributes corresponding to service data stored by the blockchain A, the blockchain B, and the blockchain C are different. For example, the blockchain A is used for storing service data of a user whose user attribute is a1 and service data of a user whose user attribute is a2, the blockchain B is used for storing service data of a user whose user attribute is b, and the blockchain C is used for storing service data of a user whose user attribute is c. In this embodiment of this application, blockchains may be classified by using a plurality of user attributes, for example, a current user location, user equipment logged in to by a user, or a user level. Using an example in which the blockchains are classified by using the user location, a1 may be a region 1, a2 may be a region 2, b may be a region 3, and c may be a region 4. In other words, the blockchain A may store service data of a user located in the region 1 and a user located in the region 2, the blockchain B may store service data of a user located in the region 3, and the blockchain C may store service data of a user located in the region 4. Actually, to facilitate sharing of data between a plurality of service organizations, the plurality of blockchains configured between the plurality of subsystems may further include a shared blockchain. The shared blockchain is used for storing service data shared among the plurality of service organizations. For example, the blockchain A is the shared blockchain and may store both the service data of the user located in the region 1 and the service data of the user located in the region 2. In addition, service data of a user whose specific location cannot be determined may also be stored in the shared blockchain.

In this application, the plurality of blockchains each may provide a data service for at least one service organization. For example, the blockchain A, the blockchain B, and the blockchain C each provide a data service for a network service provider, a bank X, a bank Y, and a supervision organization. Alternatively, the plurality of blockchains may provide a data service for at least one first service organization, and some blockchains in the plurality of blockchains provide a data service for the at least one first service organization and at least one second service organization. For example, the bank Y is not configured with the blockchain C, and configurations for other service organizations remain unchanged. In this case, the at least one first service organization may be the network service provider, the bank X, and the supervision organization, and the blockchain A, the blockchain B, and the blockchain C each may provide a data service for these three service organizations; and the at least one second service organization is the bank Y, and the blockchain A and the blockchain B each may provide a data service for the network service provider, the bank X, the supervision organization, and the bank Y. In other words, some or all of the plurality of blockchains may be configured in a subsystem deployed for an organization, and further operations such as data storage and data query can be performed based on blockchains configured in the subsystem.

In an embodiment, each subsystem may further include at least one logical node device. A network connection is provided between the logical node device and various node devices in the subsystem in which the logical node device is located. The logical node device is configured to receive service data of a user and forward the service data to a corresponding node in the subsystem in accordance with a user attribute of the user. The node configured with a blockchain in the subsystem is configured to store received service data to the blockchain, and performs a response based on the service data. In this embodiment of this application, a plurality of nodes corresponding to the blockchains may operate independently. Nodes corresponding to any two blockchains are not mutually affected. For example, at a current moment, the node device 1011 is a node device operating in a leadership state and is configured to instruct a node device that operates in a following state and that corresponds to the blockchain A about how to work; and the node device 1022 is also a node device operating in a leadership state and is configured to instruct a node device that operates in a following state and that corresponds to the blockchain B. In an election process in the blockchain A, a node device operating in the leadership state is being handed over. However, this does not affect how a node device corresponding to another blockchain works. For example, in this case, a node device corresponding to the blockchain B may normally work based on a node device that is in a leadership state.

In a service data processing process, service data of a user received by the node device 1011 is used as an example. The node device 1011 may redirect the service data to a node device that is configured with the blockchain A and that operates in a leadership state (assuming that the node device is the node device 1021). The node device 1021 broadcasts a service data storage request to node devices configured with the blockchain A, and the service data storage request is used for requesting to store the service data in the blockchain A. If the node device 1021 can receive acknowledgement messages from a preset quantity of node devices in all node devices corresponding to the blockchain A for the service data storage request, the node device 1021 may store the service data in the blockchain A of the node device 1021, respond to the user based on the service data, and broadcast a service data storage instruction to each node device, so that each node device corresponding to the blockchain A also stores the service data in the blockchain A of the node device. The preset quantity refers to a quantity of node devices that are already configured and that are required for reaching a consensus. A specific value of the preset quantity is not limited in this embodiment of this application. For example, that a blockchain is based on a Practical Byzantine Fault Tolerance (PBFT) algorithm is used as an example. A quantity of all node devices that correspond to one blockchain is 3f+1. In this case, a preset quantity may be a value that is greater than or equal to 2f+1 and that is less than or equal to 3f+1, f being any positive integer.

It is noted that the foregoing subsystem may further be a computer device. That is, the plurality of blockchains may be configured on the computer device, and the computer device performs a function performed by a subsystem.

Figure 2:
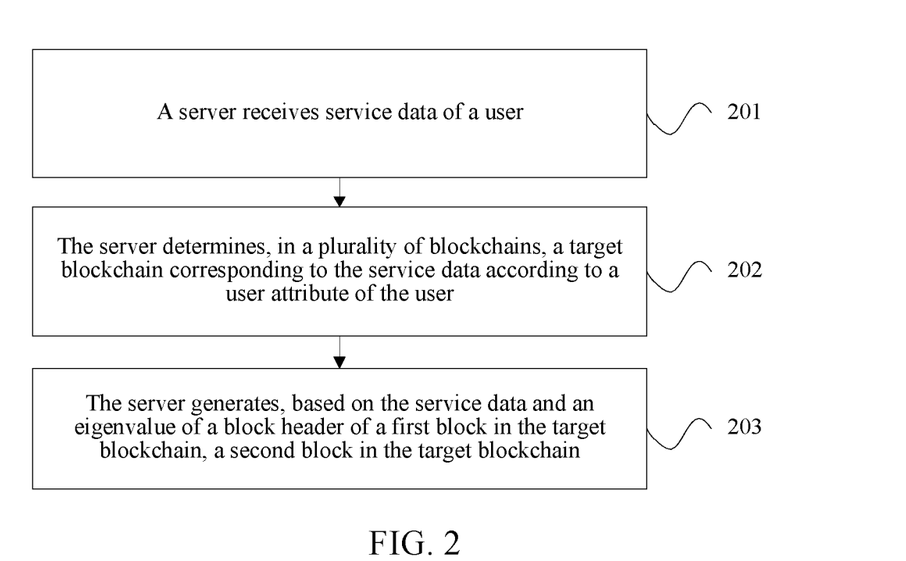
FIG. 2 is a flowchart of a service data storage method according to an embodiment of this application.

FIG. 2 is a flowchart of a service data storage method according to an embodiment of this application. The method may be applied to any subsystem in the service data processing system shown in FIG. 1. Using an example in which the subsystem is a server, the following steps are included:

201. A server receives service data of a user.

The service data refers to data generated based on a required service of the user. In an actual application scenario, the service data may have a plurality of forms. For example, the service data may be an initiation request of the user for a service, a determining request of the user for the service, local data or data input by the user that needs to be uploaded by the user to the server, and so on. Using an application scenario of a payment service as an example, when a user A transfers money to a user B, the service data may be a transfer request initiated by the user A or a transfer determining request of the user B, or may be a payment password uploaded by the user A used for paying the money to be transferred.

To further improve security of the service data processing process, and avoid receiving of service data sent by a malicious user that pretends to be a normal user, an identity of the user sending the service data may be verified. Alternatively, the step may be specifically: receiving, by the server, a service data packet; and obtaining, from the service data packet, service data and a signature of the service data by the user. The service data packet refers to complete data sent by the user. The signature may be a signature of the service data by a device of the user based on a user private key, so that the server can perform verification on the signature based on a user public key of the user. Specifically, the server may resolve the signature by using the user public key to obtain abstraction information, calculate abstraction information of the service data in accordance with an algorithm agreed with the user side, and match the two pieces of abstraction information. If matching succeeds, it is determined that validation on the signature is passed, and step 202 is performed, or if matching fails, it is determined that validation on the signature fails, indicating that the service data is probably from a malicious user or is tampered by a malicious user, and in this case, the server may omit the service data, or store the service data to a blacklist service database, the blacklist service database being used for storing service data operated by a malicious user.

It is noted that a device receiving the service data may also be the logical node device shown in FIG. 1.

202. The server determines, in a plurality of blockchains, a target blockchain corresponding to the service data according to a user attribute of the user.

In an embodiment, the target blockchain refers to a blockchain used for storing the service data at this time. Because the user attribute can present a characteristic of the user, and a plurality of users with the same user attribute may be considered as in one type of user group, to analyze service data of a type of user group in a targeted manner, service data of users with the same user attribute may be stored in one blockchain. Moreover, the users with the same user attribute usually have a similarity in service data. Therefore, it can be more conveniently to process the service data based on the user attribute. For example, a user attribute of the user A is X1, a user attribute of the user B is X2, and a user attribute of the user C is X1. Therefore, service data of the user A and the user C that are with the same attribute may be stored in one blockchain, and service data of the user B is stored in another blockchain.

In an embodiment, the server may obtain the user attribute of the user, query a preset correspondence according to the user attribute of the user, and determine, in the preset correspondence, whether there is a blockchain matching the user attribute of the user, and if yes, the server determines the blockchain matching the user attribute of the user as the target blockchain. The preset correspondence is used for indicating a correspondence between the user attribute and the blockchain, and the preset correspondence may be manually pre-configured on the server. The preset correspondence is not specifically limited in this embodiment of this application, for example, referring to the preset correspondence shown in Table 1:

TABLE 1

| User attribute | Blockchain |
| --- | --- |
| User attribute a (Beijing, Tianjin, and Hebei) | Blockchain A |
| User attribute b (Chongqing) | Blockchain B |
| User attribute c (Hainan) | Blockchain C |

In the foregoing determining process, the server may query, in the preset correspondence according to the user attribute of the user, whether there is a user attribute that is the same as the user attribute of the user, and if yes, the server obtains an identifier of a blockchain corresponding to the same user attribute, and determines the target blockchain.

In an embodiment, to reduce parameter configuration on the server side, improve efficiency of querying the preset correspondence by the server, and reduce occupation of storage space, the preset correspondence configured on the server may not cover all possible values of the user attribute. Instead, several correspondences between user attributes and blockchains are configured according to a service requirement (for example, a value range of the user attribute is various regions of a country, but only blockchains respectively corresponding to a region A and a region B are configured according to the service requirement). For a blockchain whose corresponding user attribute is not configured, service data of a user may be stored in a shared blockchain in a default manner. That is, if there is no blockchain matching the user attribute of the user, the server may determine a shared blockchain in the plurality of blockchains as the target blockchain. Alternatively, to back up received service data and avoid a user denying or tampering a service processing procedure, if the server fails to obtain a user attribute of a user, the server may store the service data in the shared blockchain.

It is noted that a device determining the target blockchain may further be the logical node device shown in FIG. 1. Further, the logical node device forwards the service data to a node device storing the target blockchain in a subsystem in which the logical node device is located. For the logical node device, a node device identifier may be used to identify a blockchain, and therefore the preset correspondence configured by the logical node device may be in a form of a correspondence between a data type and the node device identifier.

When obtaining a user attribute, the server not only may obtain a user attribute from a service data packet, but also may query for a corresponding user attribute according to a user identifier of a user. Further, the target blockchain may be determined according to the obtained user attribute. Which type of user attribute is used for performing determining is not specifically limited in this embodiment of this application. For example, for a specific determining manner, refer to the following determining manner 1 to determining manner 4:

The determining manner 1: the server determines a blockchain matching a user location of the user as the target blockchain corresponding to the service data.

In this determining manner, the user location refers to a geographical location in which the user is located. The server may obtain the user location by using a plurality of methods, for example, extract the user location of the user from the service data packet; or, obtain a user location corresponding to a network address of the service data packet according to the network address; or, obtain a user location recently reported by the user according to a user identifier of the user; or obtain, as the user location of the user, a location commonly used by the user according to the user identifier of the user. Further, the server may query, in the preset correspondence, whether there is a blockchain matching the user location of the user, and if yes, determine the configured blockchain as the target blockchain. The server may store the user location reported by the user to a configured user database, so that the server may use a user location having the most reporting times as a common location used by the user. The user location may be attached with a current time stamp when being stored, to facilitate obtaining of a user location that is recently reported by the user by the server in accordance with the time stamp.

When the user location is used as the user attribute, the preset correspondence may be a correspondence between a geographical location and a blockchain identifier. For example, the region A corresponds to the blockchain A, and the region B corresponds to the blockchain B.

The blockchain matching the user location of the user is used as the target blockchain, so that service data of users with the same user location may be determined into the same blockchain, and further service data of users in the same region may be analyzed in a targeted manner, to develop an operating policy for the region. Certainly, to minimize a routing distance required for interaction as short as possible, efficiently serve the users in the region, and reduce interaction between users corresponding to different blockchains, so as to make the service data processing process more simple and convenient, for each blockchain, a server configured with the blockchain may be deployed in a region corresponding to the blockchain.

The determining manner 2: the server determines a blockchain matching user equipment of the user as the target blockchain corresponding to the service data.

In the determining manner, the user equipment refers to a device logged in to by a user, for example, a mobile phone, a tablet computer, or a desktop computer. Further, the user equipment may further be a device of a specific brand, for example, a mobile phone of a brand A or a mobile phone of a brand B. The server may determine the user equipment to which the user logs in from the service data packet, and further determine a target blockchain matching the user equipment. When the user equipment is used as the user attribute, the preset correspondence may be a correspondence between a user equipment type and a blockchain identifier. For example, the mobile phone of the brand A corresponds to the blockchain A, the mobile phone of the brand B corresponds to the blockchain B, and the desktop computer corresponds to the blockchain C.

The blockchain matching the user equipment of the user is used as the target blockchain, so that service data of users using the same type of user equipment may be determined into the same blockchain, and further service data of users using the same type of device may be analyzed in a targeted manner, to develop an operating policy corresponding to a mobile phone user group, a brand user group, or a desktop computer user group that is at a fixed end.

The determining manner 3: the server determines a blockchain matching a user level of the user as the target blockchain corresponding to the service data.

The user level may be a user credit level, a user membership level, a user experience level, or the like. The user credit level is used for indicating a credit level of the user, the user membership level is used for indicating a use function right of the user in an application, and the user experience level is used for indicating a use degree of the application by the user. The server may obtain the user credit level from a credit database of a public security organ or a financial organization according to a user identifier of the user, and obtain the user membership level or the user experience level from a user database according to the user identifier. Which user level is specifically used as a determining basis is not limited in this embodiment of this application. A manual decision may be made considering a service requirement of the server. For example, a server providing a financial application or a lease application may use the user credit level; a server providing a social application or a multimedia resource application may use the user membership level; and a server providing the social application or a game application may use the user experience level. When the user level is used as the user attribute, the preset correspondence may be a correspondence between a user level value and a blockchain identifier, for example, a user credit level 1 corresponds to the blockchain A, and a user credit level 2 corresponds to the blockchain B.

The blockchain matching the user level of the user is used as the target blockchain, so that service data of users with the same user level may be determined into the same blockchain, and further service data of users with the same user level may be analyzed in a targeted manner, to develop an operating policy corresponding to a user group of each user level.

The determining manner 4: the server determines a blockchain matching user equipment of the user as the target blockchain corresponding to the service data.

It is considered that a cooperative account mechanism may be used between a plurality of servers that cooperates with each other. That is, even if the user does not register an account on a server A, the user may use an account registered on a server B for logging in to the server A. Therefore, the server may obtain a user account in a service data packet, and determine a server to which the user account of the user belongs, and for example, perform determining based on an account format provided by each server, and determine a blockchain corresponding to the server to which the user account of the user belongs as the target blockchain. When the user account is used as the user attribute, the preset correspondence may be a correspondence between a server identifier and a blockchain, for example, a server 1 corresponds to the blockchain A, and a server 2 that cooperates with the server 1 corresponds to the blockchain B.

The blockchain matching the user account of the user is used as the target blockchain, service data of users that belong to the same server may be determined into the same blockchain, and further service data of users that are served by a server may be analyzed in a targeted manner, to develop an operating policy corresponding to a user group of the server.

It is noted that, for the user attribute that needs to be reported by the user or the user attribute that is queried for by the server, to facilitate efficiently determining the target blockchain for the user subsequently, the server may further store the correspondence between the user and the target blockchain after determining the target blockchain corresponding to the service data of the user, so that when receiving the service data of the user again, the server may directly obtain the target blockchain from the stored correspondence according to a user identifier of the user, instead of querying the preset correspondence again after the user reports or the server queries for the user attribute.

203. The server generates, based on the service data and an eigenvalue of a block header of a first block in the target blockchain, a second block in the target blockchain, the first block being a previous block of the second block, and the second block being used for recording the service data.

In an embodiment, the server may obtain all information in the block header of the first block from the target blockchain, obtain the eigenvalue of the block header of the first block based on all the information in the block header of the first block, perform an eigenvalue calculation on service data to be stored in a block body of the second block to obtain an eigenvalue of the block body of the second block, and further, store the eigenvalue of the block header of the first block and the eigenvalue of the block body of the second block (which may further include a version number, a difficulty value, and a time stamp) into a block header of the second block; and store the service data into the block body of the second block, and generate the second block, so that the second block is related to the first block by using the eigenvalue of the block header of the first block. Therefore, an objective that blocks in the blockchain are serially connected is achieved, so that tampering on any information in a block (including the service data) can be traced by using an eigenvalue of a block header of a previous block stored in a block header of the block and detected, thereby ensuring service data security.

It is noted that a node device that is configured with the target blockchain and that is in the subsystem may store the service data into the target blockchain. When receiving the service data forwarded by the logical node device, the node device may send the service data to a node device that operates in a leadership state (briefly referred to as a leader node device) corresponding to the target blockchain. The leader node device broadcasts a service data storage request to various node devices corresponding to the target blockchain. If the leader node device can receive acknowledgement messages from a preset quantity of node devices in the various node devices for the service data storage request, the leader node device may store the service data into the target blockchain of the leader node device, respond to the user based on the service data, and broadcast a service data storage instruction to the various node devices, so that each node device (including the leader node device) corresponding to the target blockchain may store the service data into the target blockchain of the node device. When each node device sends the acknowledgement message, the node device may also send a signature of the acknowledgement message by the node device using a private key, so that the leader node device can add the received signature into the service data storage instruction. Further, a node device receiving the service data storage instruction may be enabled to verify the service data storage instruction by using the signature. If a quantity of signatures meets a preset quantity, and verification on each signature by using a public key of a corresponding node device is passed, the node device may store service data carried in the service data storage instruction into the target blockchain of the node device.

Figure 3:
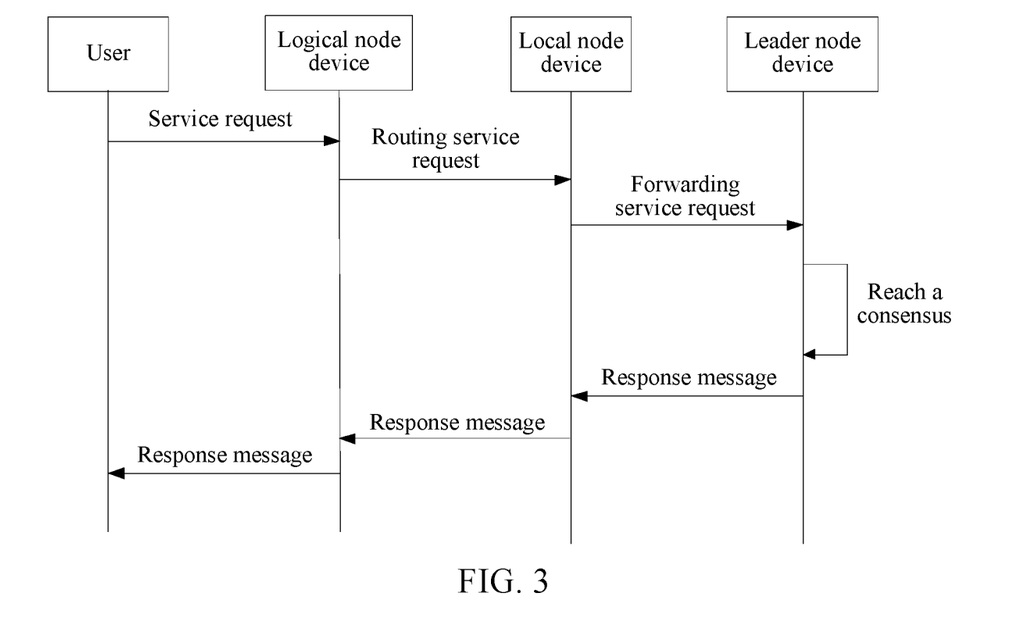
FIG. 3 is a processing flowchart of a service request according to an embodiment of this application.

FIG. 3 is a processing flowchart of a service request according to an embodiment of this application. In the processing procedure, a logical node device receives a service request of a user, selects a blockchain corresponding to the user in accordance with a configured preset correspondence, and routes the service request to a local node device configured with the blockchain, and the local node device forwards the service request to a leader node device configured with the blockchain until the leader node device receives acknowledgement messages from a preset quantity of node devices in node devices configured with the blockchain for the service storage request. According to the acknowledgement messages, the leader node device can determine that a consensus on the service request is reached in the blockchain and a response can be performed on the service request, and send a response message to the local node device, the local node device sends the response message to the logical node device, and further the logical node device returns the response message to a terminal.

In the embodiments of this application, the plurality of blockchains is configured in a server or a service data processing system, service data of users whose user attributes are the same can be stored in one blockchain, and further service data of users whose user attributes are different can be stored in the plurality of blockchains respectively. According to one aspect, because block generation processes of the blockchains are not mutually affected, even if service data of a large quantity of users is received in a short period of time, the service data can further be distributed in the blockchains in accordance with the user attributes, and further the service data can be stored in parallel in the blockchains, so that performance of the server is no longer limited by a chain structure of the blockchain, thereby improving operation efficiency of the server. For example, in a process of processing a property right registration service, a service request of a hundred thousand people can be processed based on one blockchain while a service request of one million people can be processed based on ten blockchains. According to another aspect, storage based on the user attribute can further be beneficial to analyzing service data of a type of user group in a targeted manner, and users with the same user attribute usually have a similarity in service data. Therefore, convenience of processing the service data can further be improved according to the user attribute.

In addition, due to an association between a current block and a next block that are in the blockchain, tampering of any service data in a block can be detected by using a next block, thereby avoiding a malicious user tampering or denying processed service data, and further ensuring service data security.

In an embodiment, according to a current service requirement, a blockchain configured by the server may further be updated, and there may be a plurality of update cases. The following four cases are used as an example for description in this embodiment of this application:

Case 1. When receiving a first update instruction, the server updates a correspondence between a configured user attribute and a to-be-configured blockchain based on the first update instruction.

The first update instruction carries the configured user attribute and an identifier of the to-be-configured blockchain. After receiving the first update instruction, the server may extract these two pieces of data from the first update instruction, and query, in the preset correspondence, whether there is data that is the same as any of the two pieces of data. If there is a user attribute that is the same as the configured user attribute, but there is no blockchain identifier that is the same as the identifier of the to-be-configured blockchain, the server may modify a blockchain corresponding to the configured user attribute into the to-be-configured blockchain.

Case 2. When receiving a second update instruction, the server updates a correspondence between a configured user attribute and a configured blockchain based on the second update instruction.

The second update instruction carries the configured user attribute and an identifier of the configured blockchain. After receiving the second update instruction, the server may extract these two pieces of data from the second update instruction, and query, in the preset correspondence, whether there is data that is the same as any of the two pieces of data. If there is a user attribute that is the same as the configured user attribute, and there is a blockchain identifier that is the same as the identifier of the configured blockchain, the server may delete the correspondence between the configured user attribute and an original blockchain, and add the configured user attribute as a user attribute corresponding to the configured blockchain.

Case 3. When receiving a third update instruction, the server updates a correspondence between a to-be-configured user attribute and a to-be-configured blockchain based on the third update instruction.

The third update instruction carries the to-be-configured user attribute and an identifier of the to-be-configured blockchain. After receiving the third update instruction, the server may extract these two pieces of data from the third update instruction, and query, in the preset correspondence, whether there is data that is the same as any of the two pieces of data. If there is no user attribute that is the same as the to-be-configured user attribute, and also there is no blockchain identifier that is the same as the identifier of the to-be-configured blockchain, the server may add a correspondence between the to-be-configured user attribute and the to-be-configured blockchain.

Case 4. When receiving a fourth update instruction, the server updates a correspondence between a to-be-configured user attribute and a configured blockchain based on the fourth update instruction.

The fourth update instruction carries the to-be-configured user attribute and an identifier of the configured blockchain. After receiving the fourth update instruction, the server may extract these two pieces of data from the fourth update instruction, and query, in the preset correspondence, whether there is data that is the same as any of the two pieces of data. If there is no user attribute that is the same as the to-be-configured user attribute, but there is a blockchain identifier that is the same as the identifier of the configured blockchain, the server may add the to-be-configured user attribute as a user attribute corresponding to the configured blockchain.

It is noted that when a correspondence between a user attribute and a blockchain on the server is updated, to ensure normal work of the entire service data processing system, other servers related to the updated user attribute or the updated blockchain may also perform a synchronous update process.

For the foregoing update process, using an example of adding a user attribute of a region C, it is assumed that a blockchain to be corresponded to the region C is the same as a configured blockchain corresponding to a region B. In this case, an operation personnel may trigger the fourth update instruction, so that the server may perform update based on the received fourth update instruction.

By updating the user attribute and the blockchain, service data of a new type of user group may be stored in a new blockchain in accordance with a current service requirement; or service data of a new type of user group may be stored in a configured blockchain; or a configured user attribute may correspond to a new blockchain according to a changed service requirement. Alternatively, a correspondence between a configured user attribute and a configured blockchain may further be changed. Therefore, a storage manner of the service data can be flexibly controlled.

In the foregoing update process, to avoid that a normal service data processing process is affected by a changed correspondence between a user attribute and a blockchain, the server may stop, when receiving an update instruction, processing a process of storing service data in a blockchain corresponding to the update instruction until completing an executed contract and receiving an update completion message. After completing the executed contract and receiving the update completion message, the server stores service data in accordance with an updated preset correspondence. The contract means code run in the blockchain, and is used for instructing about how to process the service data. Because the server may be executing some contracts when receiving the update instruction, to avoid that the contracts cannot be normally executed after the update, the server may wait until execution of the executed contracts are completed, and then start to process service data of an updated blockchain or user attribute.

Figure 4:
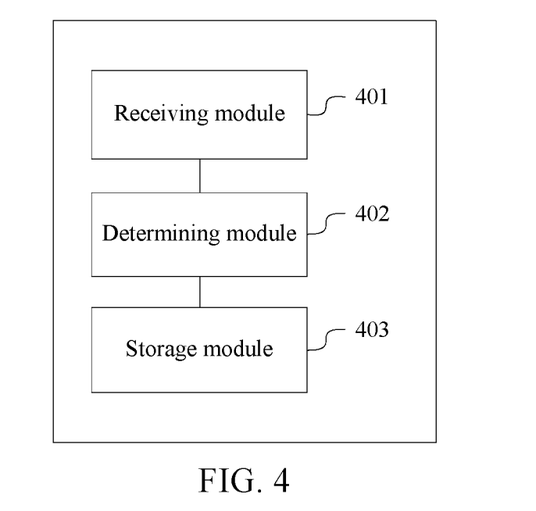
FIG. 4 is a block diagram of a service data storage apparatus according to an embodiment of this application.

FIG. 4 is a block diagram of a service data storage apparatus according to an embodiment of this application. Referring to FIG. 4, the apparatus specifically includes:

a receiving module 401, configured to receive service data of a user;

a determining module 402, configured to determine, in a plurality of blockchains, a target blockchain corresponding to the service data according to a user attribute of the user; and a storage module 403, configured to: generate, based on the service data and an eigenvalue of a block header of a first block in the target blockchain, a second block in the target blockchain, the first block being a previous block of the second block, and the second block being used for recording the service data.

In the embodiments of this application, the plurality of blockchains is configured in a server or a service data processing system, service data of users whose user attributes are the same can be stored in one blockchain, and further service data of users whose user attributes are different can be stored in the plurality of blockchains respectively. According to one aspect, because block generation processes of the blockchains are not mutually affected, even if service data of a large quantity of users is received in a short period of time, the service data can further be distributed in the blockchains in accordance with the user attributes, and further the service data can be stored in parallel in the blockchains, so that performance of the server is no longer limited by a chain structure of the blockchain, thereby improving operation efficiency of the server. According to another aspect, service data of a type of user group can be analyzed in a targeted manner, and users with the same user attribute usually have a similarity in service data. Therefore, it can further be more convenient to process the service data according to the user attribute.

In an embodiment, the determining module 402 is configured to:

query a preset correspondence according to the user attribute of the user, where the preset correspondence is used for indicating a correspondence between the user attribute and the blockchains; and if there is a blockchain matching the user attribute of the user in the preset correspondence, determine the blockchain matching the user attribute of the user as the target blockchain.

In an embodiment, the determining module 402 is further configured to:

if there is no blockchain matching the user attribute of the user, determine a shared blockchain in the plurality of blockchains as the target blockchain, where the shared blockchain is used for storing service data shared among a plurality of service organizations.

Figure 5:
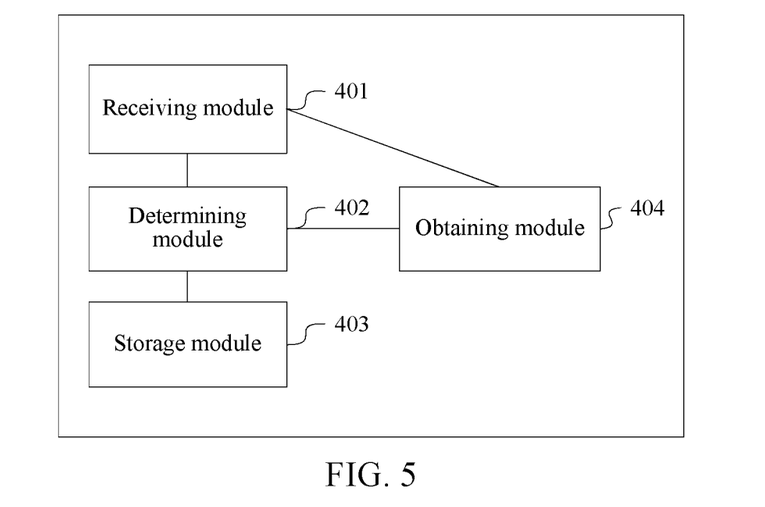
FIG. 5 is a block diagram of a service data storage apparatus according to an embodiment of this application.

In an embodiment, based on an apparatus composition in FIG. 4, referring to FIG. 5, the apparatus further includes:

the receiving module 401, configured to receive a service data packet;

an obtaining module 404, configured to obtain, from the service data packet, service data and a signature of the service data by the user; and the determining module 402, configured to: if validation on the signature of the service data is passed, determine, in the plurality of blockchains, the target blockchain corresponding to the service data according to the user attribute of the user.

Figure 6:
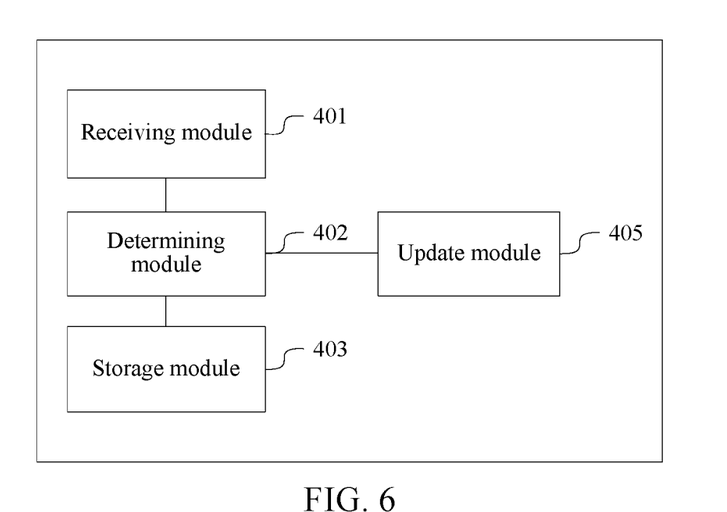
FIG. 6 is a block diagram of a service data storage apparatus according to an embodiment of this application.

In an embodiment, based on the apparatus composition in FIG. 4, referring to FIG. 6, the apparatus further includes an update module 405, configured to: when a first update instruction is received, update a correspondence between a configured user attribute and a to-be-configured blockchain based on the first update instruction; or when a second update instruction is received, update a correspondence between a configured user attribute and a configured blockchain based on the second update instruction; or when a third update instruction is received, update a correspondence between a to-be-configured user attribute and a to-be-configured blockchain based on the third update instruction; or when a fourth update instruction is received, update a correspondence between a to-be-configured user attribute and a configured blockchain based on the fourth update instruction.

In an embodiment, the determining module 402 is configured to: determine, according to a first determining manner, a blockchain matching a user location of the user as the target blockchain corresponding to the service data; and/or determine, according to a second determining manner, a blockchain matching user equipment of the user as the target blockchain corresponding to the service data; and/or determine, according to a third determining manner, a blockchain matching a user level of the user as the target blockchain corresponding to the service data; and/or determine, according to a fourth determining manner, a blockchain matching a user account of the user as the target blockchain corresponding to the service data.

All the above technical solutions may be optionally combined to form an embodiment of this application. Details are not described herein again.

It is noted that when the service data storage apparatus provided in the foregoing embodiment stores service data, a description is made by using only an example of division of the foregoing function modules. During actual application, the foregoing functions may be distributed to be accomplished by different function modules according to requirements, that is, the internal structure of the apparatus is divided into different function modules, to accomplish all or some of the functions described above. Besides, the service data storage apparatus provided in the foregoing embodiments and the service data storage method embodiments belong to the same concept. For a specific implementation process, refer to the method embodiments. Details are not described herein.

Figure 7:
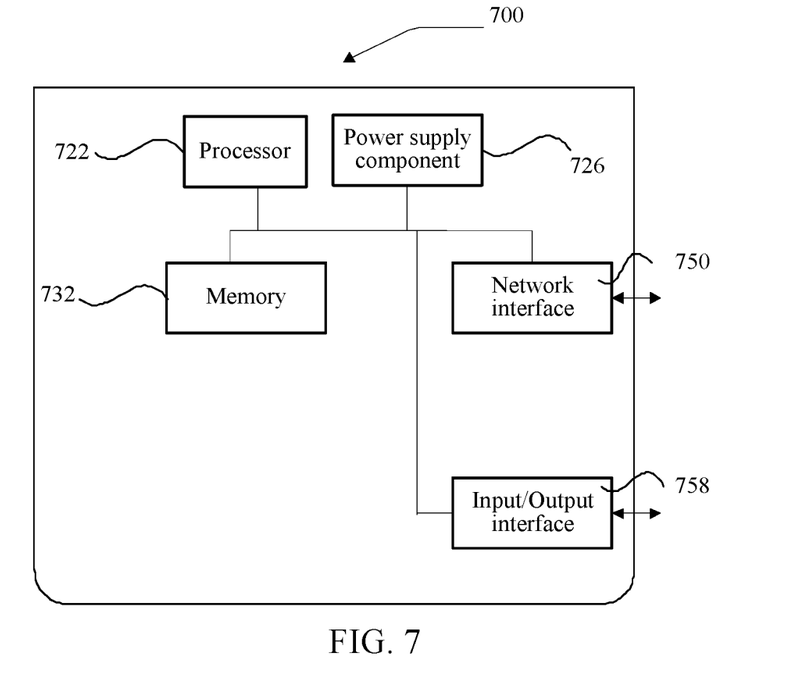
FIG. 7 is a block diagram of an electronic device 700 according to an embodiment of this application.

FIG. 7 is a block diagram of a computer device 700 according to an embodiment of this application. For example, the computer device 700 may be provided as a server. Referring to FIG. 7, the computer device 700 includes a processor 722 (e.g., processing circuitry) and a memory 732. The memory 732 stores at least one instruction, at least one program, a code set, or an instruction set. The at least one instruction, the at least one program, the code set, or the instruction set is loaded and executed by the processor 722 (e.g., the processing circuitry) to implement the foregoing service data storage method.

The computer device 700 may further include a power supply component 726, configured to perform power supply management for the computer device 700, a wired or wireless network interface 750, configured to connect the computer device 700 to a network, and an input/output (I/O) interface 758. The computer device 700 may operate an operating system stored in the memory 732, for example, Windows Server™, Mac OS X™, Unix™, Linux™, or FreeBSD™, or a similar operating system.

In an exemplary embodiment, a storage medium is further provided, for example, a memory including at least one instruction, at least one program, a code set, or an instruction set. The at least one instruction, the at least one program, the code set, or the instruction set may be loaded and executed by a processor in a computer device to accomplish the service data storage method in the foregoing embodiments. For example, the storage medium may be a ROM, a RAM, a CD-ROM, a magnetic tape, a floppy disk, and an optical data storage device.

A person of ordinary skill in the art may understand that all or some of the steps of the foregoing embodiments may be implemented by using hardware, or may be implemented by a program instructing relevant hardware. The program may be stored in a storage medium. The above-mentioned storage medium may be a read-only memory, a magnetic disk, an optical disc, or the like.

The above descriptions are exemplary embodiments of this application, but not intended to limit this application. Any modification, equivalent replacement, or improvement made without departing from the spirit and principle of this application can fall within the protection scope of this application.

What is claimed is:

1. A service data storage method, comprising:
   receiving, by processing circuitry of an apparatus, service data of a user;
   determining, by the processing circuitry and in a plurality of blockchains, a target blockchain according to a user attribute of the user; and
   generating, by the processing circuitry and based on the service data and an eigenvalue of a block header of a first block in the target blockchain, a second block in the target blockchain, the first block being a previous block of the second block, and the second block being used for recording the service data.

2. The method according to claim 1, wherein the determining comprises:
   determining, by the processing circuitry, whether one of the plurality of blockchains corresponds to the user attribute of the user according to preset correspondence information; and
   determining, by the processing circuitry, the one of the plurality of blockchains corresponding to the user attribute of the user as the target blockchain in response to a determination that one of the plurality of blockchains corresponds to the user attribute of the user.

3. The method according to claim 2, further comprising:
in response to a determination that there is no blockchain corresponding to the user attribute of the user,
determining, by the processing circuitry, a shared blockchain in the plurality of blockchains as the target blockchain, the shared blockchain being configured to store service data shared among a plurality of service organizations.

4. The method according to claim 1, wherein
the receiving includes
receiving, by the processing circuitry, a service data packet, and
obtaining, by the processing circuitry and from the service data packet, the service data and a signature of the user corresponding to the service data; and
the determining includes
validating, by the processing circuitry, the signature of the service data.

5. The method according to claim 1, further comprising:
updating, by the processing circuitry, the preset correspondence information based on an update instruction.

6. The method according to claim 1, wherein the determining comprises:
determining, by the processing circuitry, the target blockchain according to at least one of a user location of the user, a user equipment of the user, a user level of the user, and a user account of the user.

7. The method according to claim 1, wherein the plurality of blockchains provides a data service for at least one service organization.

8. A service data storage apparatus, comprising processing circuitry configured to:
receive service data of a user;
determine, in a plurality of blockchains, a target blockchain according to a user attribute of the user; and
generate, based on the service data and an eigenvalue of a block header of a first block in the target blockchain, a second block in the target blockchain, the first block being a previous block of the second block, and the second block being used for recording the service data.

9. The apparatus according to claim 8, wherein the processing circuitry is further configured to:
determine whether one of the plurality of blockchains corresponds to the user attribute of the user according to preset correspondence information; and
determine the one of the plurality of blockchains corresponding to the user attribute of the user as the target blockchain in response to a determination that one of the plurality of blockchains corresponds to the user attribute of the user.

10. The apparatus according to claim 9, wherein the processing circuitry is further configured to:
in response to a determination that there is no blockchain corresponding to the user attribute of the user,
determine a shared blockchain in the plurality of blockchains as the target blockchain, the shared blockchain being configured to store service data shared among a plurality of service organizations.

11. The apparatus according to claim 8, wherein the processing circuitry is further configured to:
receive a service data packet;
obtain, from the service data packet, the service data and a signature of the user corresponding to the service data; and
validate the signature of the service data.

12. The apparatus according to claim 8, wherein the processing circuitry is further configured to:
update the preset correspondence information based on an update instruction.

13. The apparatus according to claim 8, wherein the processing circuitry is further configured to:
determine the target blockchain according to at least one of a user location of the user, a user equipment of the user, a user level of the user, and a user account of the user.

14. The apparatus according to claim 8, wherein the plurality of blockchains provides a data service for at least one service organization.

15. A non-transitory computer-readable medium storing a program executable by at least one processor to perform:
receiving service data of a user;
determining, in a plurality of blockchains, a target blockchain according to a user attribute of the user; and
generating, based on the service data and an eigenvalue of a block header of a first block in the target blockchain, a second block in the target blockchain, the first block being a previous block of the second block, and the second block being used for recording the service data.

16. The non-transitory computer-readable storage medium according to claim 15, wherein the program is executable by the at least one processor to perform:
determining whether one of the plurality of blockchains corresponds to the user attribute of the user according to preset correspondence information; and
determining the one of the plurality of blockchains corresponding to the user attribute of the user as the target blockchain in response to a determination that one of the plurality of blockchains corresponds to the user attribute of the user.

17. The non-transitory computer-readable storage medium according to claim 16, wherein the program is executable by the at least one processor to perform:
in response to a determination that there is no blockchain corresponding to the user attribute of the user,
determining a shared blockchain in the plurality of blockchains as the target blockchain, the shared blockchain being configured to store service data shared among a plurality of service organizations.

18. The non-transitory computer-readable storage medium according to claim 15, wherein the program is executable by the at least one processor to perform:
receiving a service data packet;
obtaining, from the service data packet, the service data and a signature of the user corresponding to the service data; and
validating the signature of the service data.

19. The non-transitory computer-readable storage medium according to claim 15, wherein the program is executable by the at least one processor to perform:
updating the preset correspondence information based on an update instruction.

20. The non-transitory computer-readable storage medium according to claim 15, wherein the program is executable by the at least one processor to perform:
determining the target blockchain according to at least one of a user location of the user, a user equipment of the user, a user level of the user, and a user account of the user.

* * * * *